United States Patent
Racunas et al.

(10) Patent No.: US 7,747,932 B2
(45) Date of Patent: Jun. 29, 2010

(54) REDUCING THE UNCORRECTABLE ERROR RATE IN A LOCKSTEPPED DUAL-MODULAR REDUNDANCY SYSTEM

(75) Inventors: Paul B. Racunas, Marlborough, MA (US); Joel S. Emer, Acton, MA (US); Arijit Biswas, Holden, MA (US); Shubhendu S. Mukherjee, Framingham, MA (US); Steven E. Raasch, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 1079 days.

(21) Appl. No.: 11/173,835

(22) Filed: Jun. 30, 2005

(65) Prior Publication Data

US 2007/0022348 A1 Jan. 25, 2007

(51) Int. Cl.
*H03M 13/00* (2006.01)

(52) U.S. Cl. ................. 714/799; 714/12; 714/48; 714/798

(58) Field of Classification Search ........... 714/12, 714/48, 798, 799
See application file for complete search history.

(56) References Cited

U.S. PATENT DOCUMENTS

| | | | | |
|---|---|---|---|---|
| 5,604,754 A | * | 2/1997 | Itskin et al. | 714/798 |
| 5,748,873 A | * | 5/1998 | Ohguro et al. | 714/11 |
| 5,751,955 A | * | 5/1998 | Sonnier et al. | 714/12 |
| 5,764,660 A | * | 6/1998 | Mohat | 714/820 |
| 6,115,365 A | * | 9/2000 | Newberg et al. | 370/312 |
| 6,233,702 B1 | * | 5/2001 | Horst et al. | 714/48 |
| 6,604,177 B1 | * | 8/2003 | Kondo et al. | 711/150 |
| 6,615,366 B1 | | 9/2003 | Grochowski | |
| 6,938,183 B2 | * | 8/2005 | Bickel | 714/12 |
| 7,107,484 B2 | * | 9/2006 | Yamazaki et al. | 714/12 |
| 2002/0073357 A1 | | 6/2002 | Dhong | |
| 2004/0123201 A1 | | 6/2004 | Nguyen | |

* cited by examiner

*Primary Examiner*—Esaw T Abraham
(74) *Attorney, Agent, or Firm*—Thomas R. Lane

(57) ABSTRACT

Embodiments of apparatuses and methods for reducing the uncorrectable error rate in a lockstepped dual-modular redundancy system are disclosed. In one embodiment, an apparatus includes two processor cores, a micro-checker, a global checker, and fault logic. The micro-checker is to detect whether a value from a structure in one core matches a value from the corresponding structure in the other core. The global checker is to detect lockstep failures between the two cores. The fault logic is to cause the two cores to be resynchronized if there is a lockstep error but the micro-checker has detected a mismatch.

17 Claims, 6 Drawing Sheets

REDUCING THE UNCORRECTABLE ERROR RATE IN A LOCKSTEPPED DUAL-MODULAR REDUNDANCY SYSTEM

BACKGROUND

1. Field

The present disclosure pertains to the field of data processing, and more particularly, to the field of error mitigation in data processing apparatuses.

2. Description of Related Art

As improvements in integrated circuit manufacturing technologies continue to provide for smaller dimensions and lower operating voltages in microprocessors and other data processing apparatuses, makers and users of these devices are becoming increasingly concerned with the phenomenon of soft errors. Soft errors arise when alpha particles and high-energy neutrons strike integrated circuits and alter the charges stored on the circuit nodes. If the charge, alteration is sufficiently large, the voltage on a node may be changed from a level that represents one logic state to a level that represents a different logic state, in which case the information stored on that node becomes corrupted. Generally, soft error rates increase as circuit dimensions decrease, because the likelihood that a striking particle will hit a voltage node increases when circuit density increases. Likewise, as operating voltages decrease, the difference between the voltage levels that represent different logic states decreases, so less energy is needed to alter the logic states on circuit nodes and more soft errors arise.

Blocking the particles that cause soft errors is extremely difficult, so data processing apparatuses often include techniques for detecting, and sometimes correcting, soft errors. These error mitigation techniques include dual-modular redundancy ("DMR") and triple-modular redundancy ("TMR"). With DMR, two identical processors or processor cores execute the same program in lockstep, and their results are compared. With TMR, three identical processors are run in lockstep.

An error in any one processor is detectable using DMR or TMR, because the error will cause the results to differ. TMR provides an advantage in that recovery from the error may be accomplished by assuming that a matching result of two of the three processors is the correct result.

Recovery in a DMR system is also possible by checking all results before they are committed to a register or otherwise allowed to affect the architectural state of the system. Then, recovery may be accomplished by re-executing all instructions since the last checkpoint if an error is detected. However, this approach may not be practical due to latency or other design constraints. Another approach is to add a rollback mechanism that would permit an old architectural state to be recovered if an error is detected. This approach may also be impractical due to design complexity, and may suffer from the problem that the results of re-execution from a previous state may differ from the original results due to the occurrence of a non-deterministic event, such as an asynchronous interrupt, or the re-execution of an output operation that is not idempotent.

Additionally, DMR and TMR may actually increase the error rate because their implementation requires additional circuitry subject to soft errors, and because they may detect errors that would otherwise go undetected but not result in system failure. For example, an error in a structure used to predict which branch of a program should be speculatively executed may result in an incorrect prediction, but the processor would automatically recover when the branch condition was ultimately evaluated.

BRIEF DESCRIPTION OF THE FIGURES

The present invention is illustrated by way of example and not limitation in the accompanying figures.

DETAILED DESCRIPTION

The following describes embodiments of apparatuses and methods for reducing the uncorrectable error rate in a lockstepped dual-modular redundancy system. In the following description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, techniques, and the like have not been described in detail, to avoid unnecessarily obscuring the present invention.

DMR may be used to provide error detection and correction. However, it may also increase the error rate by detecting errors that would not result in system failure. Embodiments of the present invention may provide for reducing the error rate in a DMR system by using micro-checkers to detect such "false" errors so that they may be ignored. Other embodiments may provide for reducing the error rate in a DMR system by using micro-checkers for certain structures, such as a cache, for which values may be regenerated and compared to the original values to determine which of the two processors should be synchronized to the state of the other processor, thus avoiding the cost of a complete rollback mechanism. Such embodiments of the present invention may be desirable to provide some of the benefits of DMR (e.g., error detection and correction capability), while reducing some of the drawbacks (e.g., false errors, cost of complete recovery capability).

Furthermore, embodiments of the present invention may be desirable to avoid protecting certain structures with parity or error correction code mechanisms, which may be costly, and may also be unnecessary for structures incapable of corrupting architectural state. Connecting these structures to a micro-checker according to an embodiment of the present invention may provide the capability to recover from an error without a need to determine, through parity or otherwise, in which of two DMR cores the error has occurred.

Figure 1:
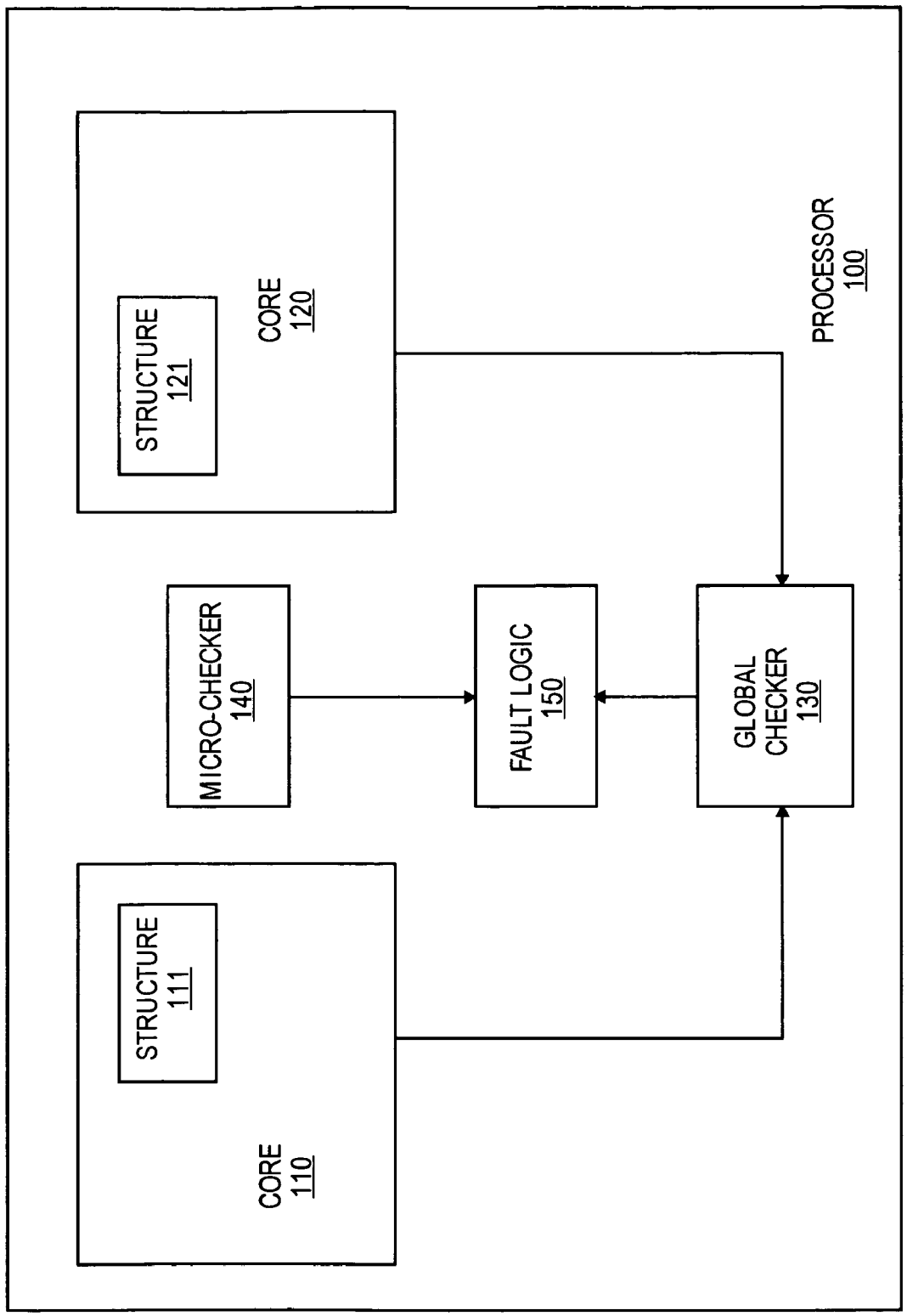
FIG. 1 illustrates an embodiment of the present invention in a multicore processor.

FIG. 1 illustrates an embodiment of the present invention in multicore processor 100. Generally, a multicore processor is a single integrated circuit including more than one execution core. An execution core includes logic for executing instructions. In addition to the execution cores, a multicore processor may include any combination of dedicated or shared resources within the scope of the present invention. A dedicated resource may be a resource dedicated to a single core, such as a dedicated level one cache, or may be a resource dedicated to any subset of the cores. A shared resource may be a resource shared by all of the cores, such as a shared level two cache or a shared external bus unit supporting an interface between the multicore processor and another component, or may be a resource shared by any subset of the cores. The present invention may also be embodied in an apparatus other than a multicore processor, such as in a multiprocessor system having at least two processors, each with at least one core.

Processor 100 includes core 110 and core 120. Cores 110 and 120 may be based on the design of any of a variety of different types of processors, such as a processor in the Pentium® Processor Family, the Itanium® Processor Family, or other processor family from Intel Corporation, or another processor from another company. Processor 100 also includes global checker 130 and micro-checker 140.

Global checker 130 compares an output from core 110 to an output from core 120 according to any known technique for detecting a lockstep fault in a DMR system, such as with a comparator circuit. For example, the outputs of core 110 and 120 may be compared when cores 110 and 120 synchronously run identical copies of a program with identical inputs.

Core 110 includes structure 111, which may be any circuit, logic, functional block, module, unit or other structure that generates or holds a value that should match a corresponding value from corresponding structure 121 included in core 120 when cores 110 and 120 operate in lockstep.

In one embodiment, structures 111 and 121 may be structures that cannot alter the architectural state of processor 100 or a system including processor 100. For example, structures 111 and 121 may be prediction structures, such as conditional branch predictor, jump predictors, return-address predictors, or memory dependence predictors.

In another embodiment, structures 111 and 121 may be structures whose content is duplicated elsewhere in a system including processor 100, or may be regenerated. For example, structure 111 and 121 may be cache structure, where each unmodified cache line or entry is a value that may be regenerated by reloading the cache line or entry from a higher level cache or other memory in the system.

Micro-checker 140 compares a value from structure 111 to the corresponding value from structure 121. In different embodiments, the value compared may vary depending on the nature of structures 111 and 112, and may be, for example, a single bit indicating whether a conditional branch should be taken or a jump should occur, a multiple bit predicted return address, or a multiple bit cache line or entry. Therefore, the nature of micro-checker 140 may vary in different embodiments, and the comparison may be performed according to any known technique, such as with an exclusive or gate or a comparator circuit.

In one embodiment, micro-checker 140 may be configured to retain the result of its comparison at least until lockstepped program execution has reached a point where a lockstep fault detected by global checker 130 could not be attributed to a mismatch between the values compared by micro-checker 140. This configuration of micro-checker 140 may be accomplished without any special storage element, for example, if micro-checker is combinational logic and the values compared remain static at least until each lockstep fault detection point is reached, or may be accomplished with a register or other storage element to store the result of micro-checker 140.

In other embodiments, micro-checker need not be configured to retain the result of its comparison.

Processor 100 also includes fault logic 150. Fault logic 150 may be any hardware, microcode, programmable logic, processor abstraction layer, firmware, software, or other logic to dictate the response of processor 100 to the detection of a lockstep fault by global checker 130. Upon the detection of a lockstep fault by global checker 130, if micro-checker 140 has detected a mismatch between the value from structure 111 and the corresponding value from structure 121, fault logic 150 causes the core 110 and core 120 to be resynchronized as described below. However, if micro-checker 140 has not detected a mismatch between the value from structure 111 and the corresponding value from structure 121, fault logic 150 indicates the detection of an uncorrectable error according to any known approach to indicating a system failure, such as reporting a fault code and halting operation.

Although FIG. 1 shows only structure 111 in core 110 and structure 121 in core 120 as providing inputs to micro-checker 140, any number of structures and micro-checkers may be used within the scope of the present invention. For example, FIG. 2 shows an embodiment of the present invention using multiple structures per core, a single micro-checker, and fingerprint logic to reduce cross-core bandwidth.

Figure 2:
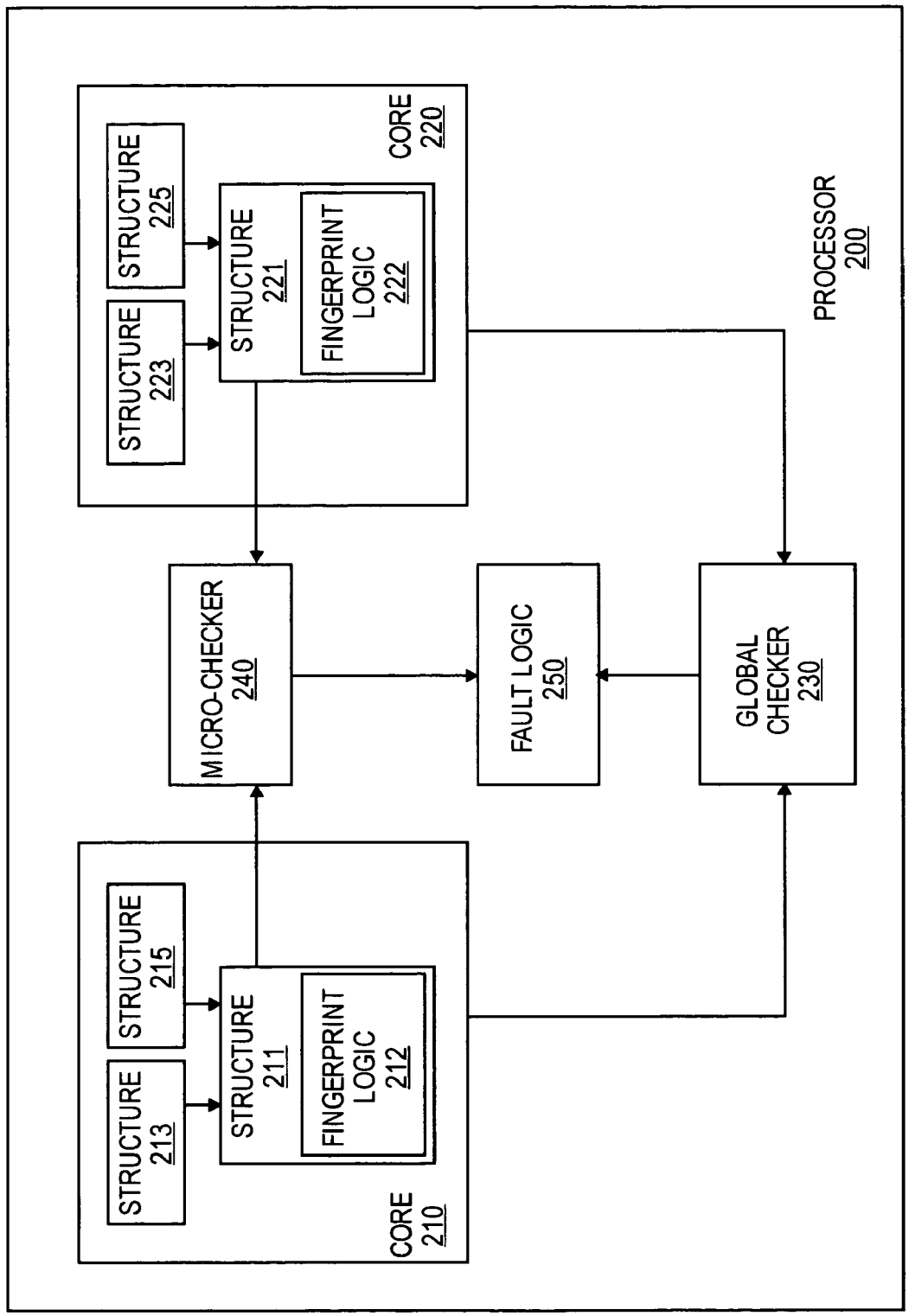
FIG. 2 illustrates an embodiment of the present invention using micro-check fingerprint logic to reduce cross-core bandwidth.

In FIG. 2, processor 200 includes cores 210 and 220, global checker 230, micro-checker 240, and fault logic 250. Core 210 includes structures 211, 213, and 215, and processor core 220 includes structures 221, 223, and 225.

Structure 211 includes fingerprint logic 212 to generate a fingerprint based on values from structures 213 and 215, where the structures 213 and 215 may be any structures as described above with respect to structure 111 of FIG. 1. Similarly, structure 221 includes fingerprint logic 222 to generate a fingerprint, according to the same approach as used by fingerprint logic 212, based on values from structures 223 and 225.

Fingerprint logic 212 and fingerprint logic 222 may be implemented with any known approach to combining two or more values into a single value, such as the generation of a checksum using a cyclic redundancy checker. Fingerprint logic 212 and fingerprint logic 222 may be used so that micro-checker 240 may detect mismatches between structures 213 and 223 and structures 215 and 225, instead of using one micro-checker for structures 213 and 223 and another for structures 215 and 225.

Fingerprint logic 212 and fingerprint logic 222 may also be used to reduce cross-core bandwidth. For example, fingerprint logic 212 may be used to combine values from structures 213 and 215 such that the number of bits in the output of fingerprint logic 212 is less than the total number of bits in the two values. While in some embodiments it may be desirable for fingerprint logic 212 to output unique values for every combination of inputs, in other embodiments it may be desirable to accept less than 100% accuracy from micro-checker 240 in exchange for a reduction in the number of bits connected to each input of micro-checker 240. Less than 100% accuracy of micro-checker 240 may be acceptable because a failure of micro-checker 240 to detect a correctable lockstep failure would be interpreted as an uncorrectable lockstep failure, but not as correct lockstep operation that could lead to corruption of the system.

Figure 3:
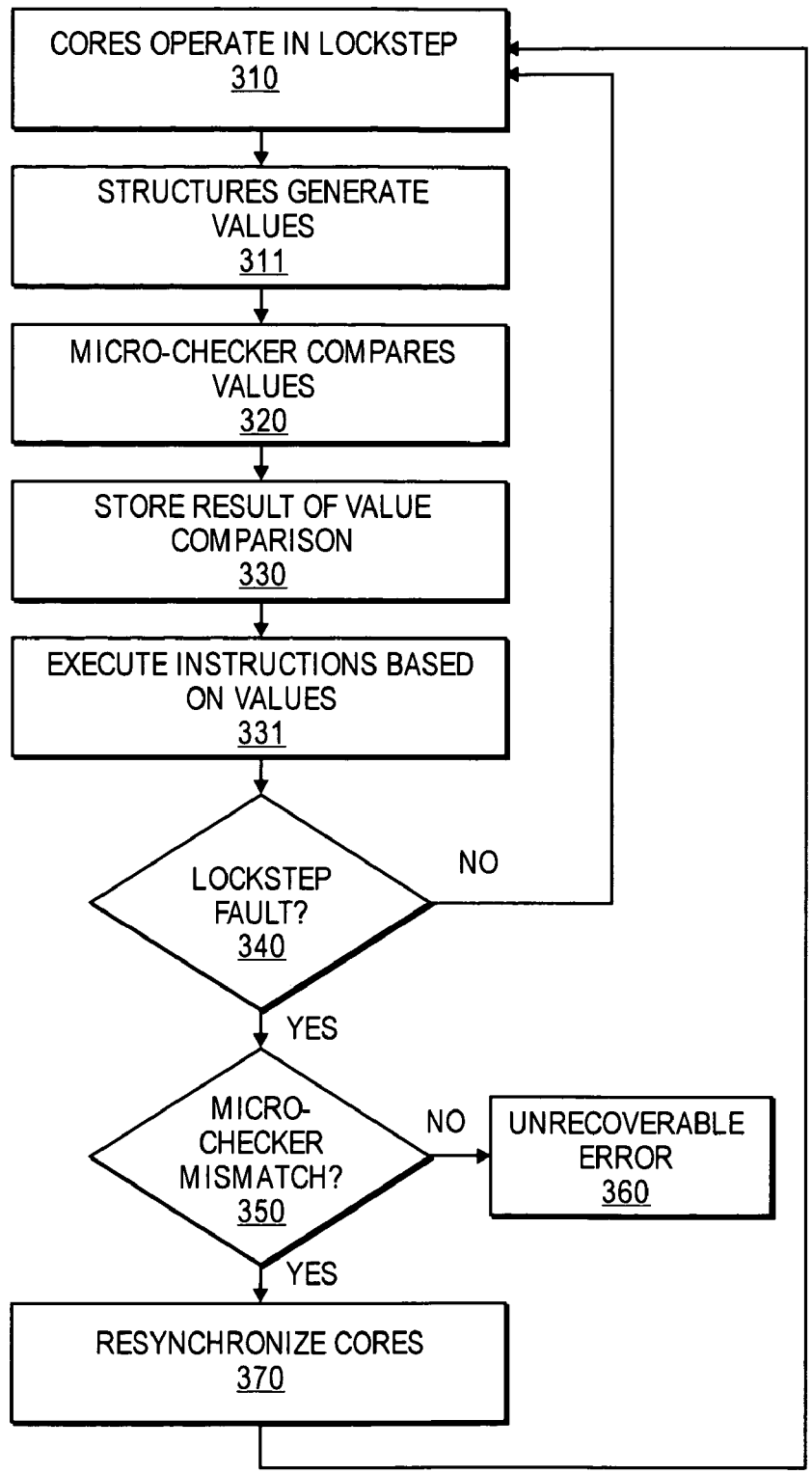
FIG. 3 illustrates an embodiment of the present invention in a method for reducing the uncorrectable error rate in a lockstepped dual-modular redundancy system.

FIG. 3 illustrates an embodiment of the present invention in method 300 for reducing the uncorrectable error rate in a lockstepped dual-modular redundancy system including processor 100 of FIG. 1, where structures 111 and 121 are structures that cannot alter architectural state, e.g., prediction structures.

In box 310, cores 110 and 120 are operating in lockstep. In box 311, structure 111 generates a first value and structure 121 generates a second value. The first value may or may not match the second value. In box 320, micro-checker 140 compares values from structures 111 and 121. In box 330, the result of the comparison in box 320 is stored.

In box 331, core 110 executes a first instruction based on the value generated by structure 111, and core 120 executes a second instruction based on the value generated by structure 121. The first and second instructions may or may not be the same instruction. The first and second values may serve as the basis for determining what instruction or instructions are executed by indicating the result of a conditional branch prediction, a jump prediction, a return-address prediction, a memory-dependence prediction, or any other prediction or result that cannot alter architectural state.

From box 331, method 300 proceeds directly to box 340, or proceeds to box 340 after cores 110 and 120 execute any number of additional instructions.

In box 340, global checker 130 compares outputs from cores 110 and 120. If the outputs match, lockstep operation of cores 110 and 120 continues in box 310, unaffected by any error correction, recovery, or notification technique, regardless of the result stored in box 330. However, if global checker 140 detects a lockstep fault in box 340, then method 300 continues to box 350.

From box 350, if the result stored in box 330 indicates that the value from structure 111 matches the value from structure 121, method 300 proceeds to box 360. In box 360, fault logic 150 indicates the detection of an uncorrectable error, for example by reporting a fault code and halting the system.

From box 350, if the result stored in box 330 indicates a mismatch between the values from structures 111 and 121, method 300 proceeds to box 370. In box 370, fault logic 150 causes the resynchronization of cores 110 and 120. This resynchronization may be accomplished by changing the architectural state of core 110 to match the architectural state of core 120, or vice versa. Method 300 then returns to box 310.

Figure 4:
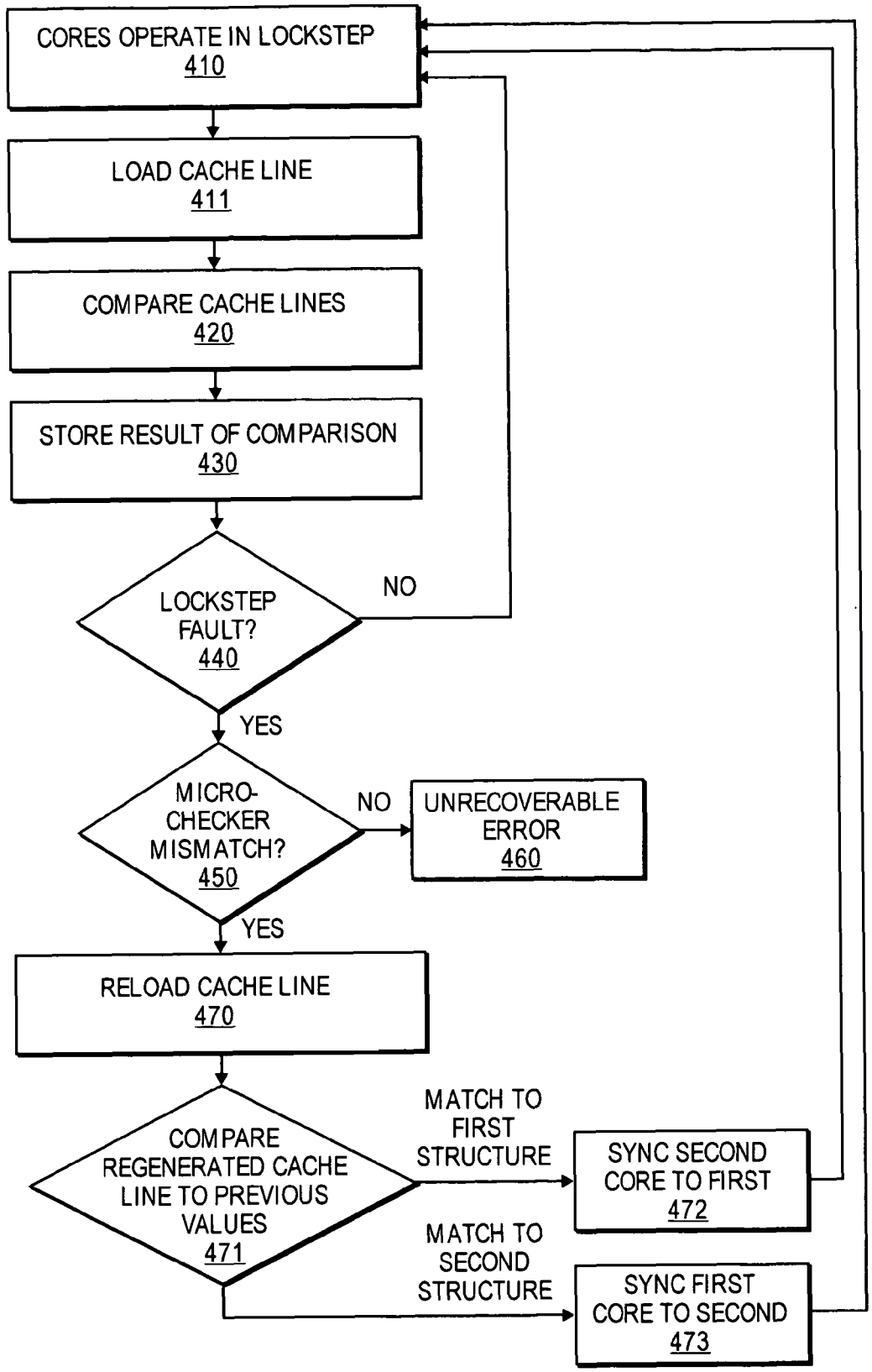
FIG. 4 illustrates another embodiment of the present invention in a method for reducing the uncorrectable error rate in a lockstepped dual-modular redundancy system.

FIG. 4 illustrates an embodiment of the present invention in method 400 for reducing the uncorrectable error rate in a lockstepped dual-modular redundancy system including processor 100 of FIG. 1, where structures 111 and 121 are structures whose content is duplicated elsewhere in the system, or may be regenerated, e.g., caches.

In box 410, cores 110 and 120 are operating in lockstep. In box 411, an instruction causing a load to an unmodified cache line in structure 111 is executed by core 110 and to an unmodified cache line in structure 121 generates a second value. From box 411, method 400 proceeds directly to box 420, or proceeds to box 420 after cores 110 and 120 execute any number of additional instructions.

In box 420, micro-checker 140 compares a value, e.g., the cache line loaded in box 411, from structure 111 to a value, e.g., the cache line loaded in box 411, from structure 121. In box 430, the result of the comparison in box 420 is stored.

From box 430, method 400 proceeds directly to box 440, or proceeds to box 440 after cores 110 and 120 execute any number of additional instructions.

In box 440, global checker 130 compares outputs from cores 110 and 120. If the outputs match, lockstep operation of cores 110 and 120 continues in box 410, unaffected by any error correction, recovery, or notification technique, regardless of the result stored in box 430. However, if global checker 140 detects a lockstep fault in box 440, then method 400 continues to box 450.

From box 450, if the result stored in box 430 indicates that the value from structure 111 matches the value from structure 121, method 400 proceeds to box 460. In box 460, fault logic 150 indicates the detection of an uncorrectable error, for example by reporting a fault code and halting the system.

From box 450, if the result stored in box 430 indicates a mismatch between the values from structures 111 and 121, method 400 proceeds to box 470. In boxes 470 to 473, fault logic 150 causes the resynchronization of cores 110 and 120.

In box 470, the values from structures 111 and 121 are found elsewhere in the system, or otherwise regenerated, e.g., by reloading the cache line loaded in box 411. The regenerated value (e.g., if a single copy of the value is obtained from where it is duplicated in the system) or values (e.g., if one copy of the value per structure is obtained from where it is duplicated in the system) may be loaded into a register or registers, or other location or locations, provided for comparison to the values from structures 111 and 121. Alternatively, the values from structure 111 and 121 may be moved to registers or other locations provided for comparison to the regenerated value or values, which may be obtained, for example, by re-executing the instruction executed in box 411.

In box 471, the regenerated value or values are compared to the values from structures 111 and 121. If the regenerated value matches the value from structure 111, then, in box 472, core 120 is synchronized to core 110, e.g., by changing the architectural state of core 120 to match the architectural state of core 110. If the regenerated value matches the value from structure 121, then, in box 473, core 110 is synchronized to core 120, e.g., by changing the architectural state of core 110 to match the architectural state of core 120. From boxes 472 and 473, method 400 returns to box 410.

Figure 5:
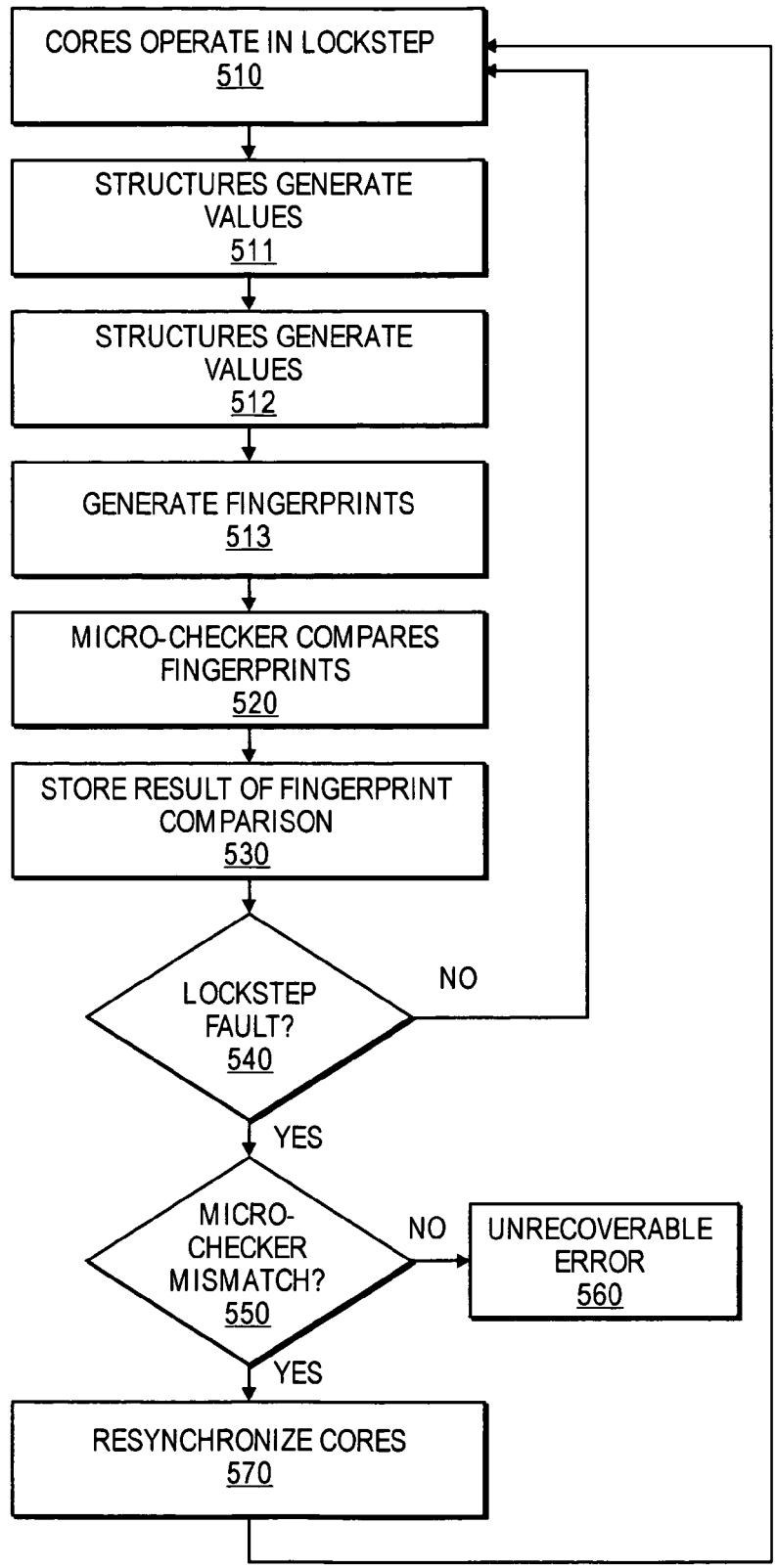
FIG. 5 illustrates another embodiment of the present invention in a method for reducing the uncorrectable error rate in a lockstepped dual-modular redundancy system.

FIG. 5 illustrates an embodiment of the present invention in method 500 for reducing the uncorrectable error rate in a lockstepped dual-modular redundancy system including processor 200 of FIG. 2.

In box 510, cores 210 and 220 are operating in lockstep. In box 511, structure 213 generates a value and structure 223 generates a value. The value from structure 213 may or may not match the value from structure 223. In box 512, structure 215 generates a value and structure 225 generates a value. The value from structure 215 may or may not match the value from structure 225.

In box 513, structure 211 generates a fingerprint value based on the values from structures 213 and 215, and structure 221 generates a fingerprint value based on the values from structures 223 and 225. The fingerprint values may be generated according to any known technique for combining values, such as using a cyclic redundancy checker to generate a checksum.

In box 520, micro-checker 240 compares the fingerprint values from structures 211 and 221. In box 530, the result of the comparison in box 520 is stored.

In box 540, global checker 230 compares outputs from cores 210 and 220. If the outputs match, lockstep operation of cores 210 and 220 continues in box 510, unaffected by any error correction, recovery, or notification technique, regardless of the result stored in box 530. However, if global checker 240 detects a lockstep fault in box 540, then method 500 continues to box 550.

From box 550, if the result stored in box 530 indicates that the fingerprint value from structure 211 matches the fingerprint value from structure 221, method 500 proceeds to box

560. In box 560, fault logic 250 indicates the detection of an uncorrectable error, for example by reporting a fault code and halting the system.

From box 550, if the result stored in box 530 indicates a mismatch between the values from structures 211 and 221, method 500 proceeds to box 570. In box 570, fault logic 250 causes the resynchronization of cores 210 and 220. This resynchronization may be accomplished by changing the architectural state of core 210 to match the architectural state of core 220, or vice versa. Method 500 then returns to box 510.

Within the scope of the present invention, the methods illustrated in FIGS. 3, 4, and 5 may be performed in a different order, with illustrated steps omitted, with additional steps added, or with a combination of reordered, combined, omitted, or additional steps. For example, box 330, 430, or 530 (storing the result of the micro-checker's comparison) may be omitted if the output of the micro-checker remains static until box 350, 450, or 550 (examining the result of the micro-checker's comparison), respectively, is performed.

Other examples of methods in which box 330 (storing the result of the micro-checker's comparison) may be omitted are embodiments of the present invention in which the output of the micro-checker does not need to be retained. In one such embodiment, a method may proceed from the micro-checker comparison of box 320 to the decision of box 350 based on the micro-checker comparison (or, boxes 320 and 350 may be merged). In this embodiment, if the micro-checker detects a mismatch (in either 320 or 350), a processor's existing branch misprediction recovery mechanism may be used to flush speculative state, and thus synchronize the cores to non-speculative state in box 370. If the micro-checker does not detect a mismatch, then the method of this embodiment may proceed to box 331 to execute instructions based on the prediction, then to box 340 for the global checker to check for a lockstep fault, then, if a lockstep fault is detected, to box 360 to indicate an unrecoverable error.

Figure 6:
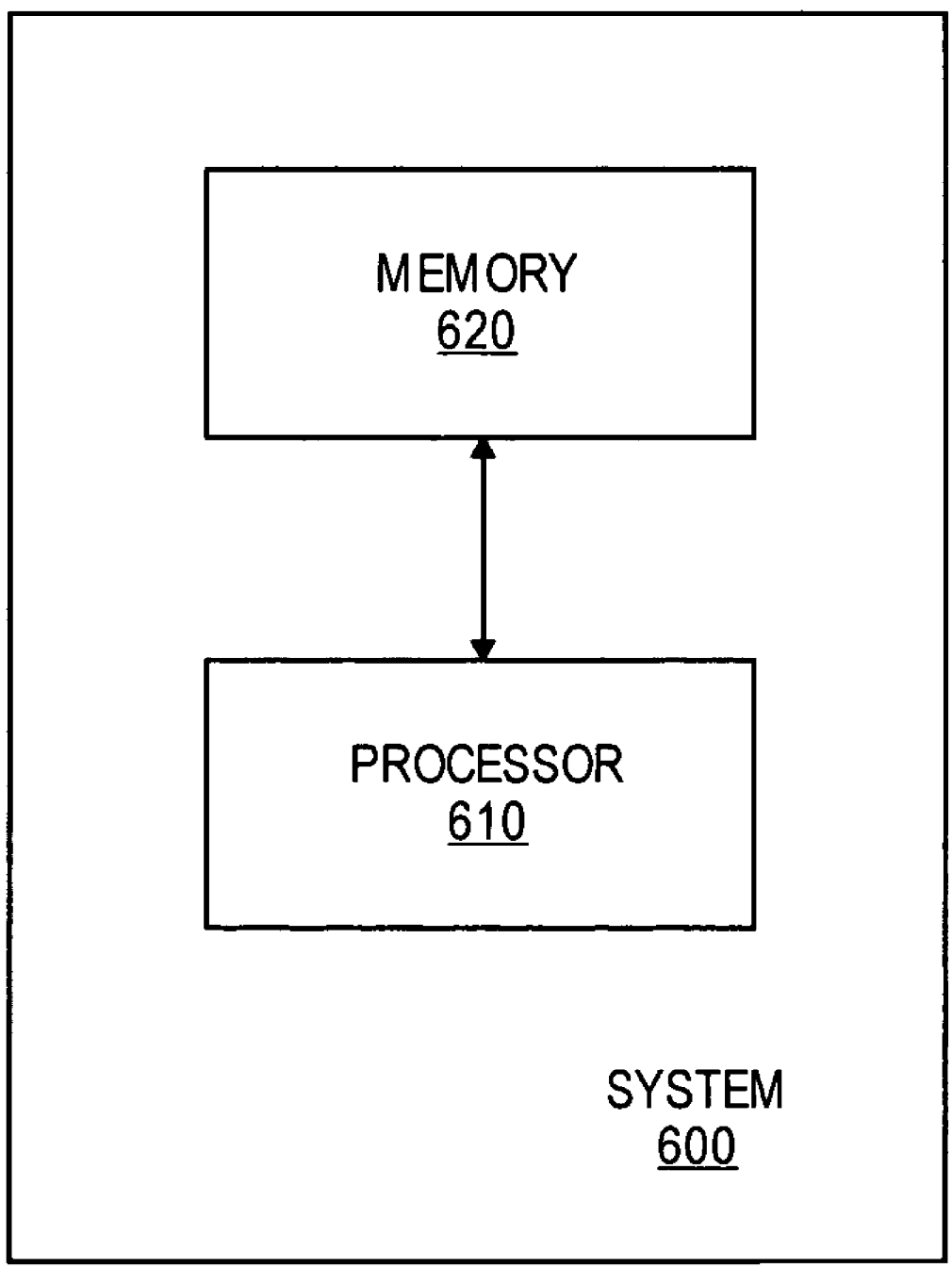
FIG. 6 illustrates an embodiment of the present invention in a lockstepped dual-modular redundancy system.

FIG. 6 illustrates an embodiment of the present invention in lockstepped dual-modular redundancy system 600. System 600 includes multicore processor 610 and system memory 620. Processor 610 may be any processor as described above for FIGS. 1 and 2. System memory 620 may be any type of memory, such as semiconductor based static or dynamic random access memory, semiconductor based flash or read only memory, or magnetic or optical disk memory. Processor 610 and system memory 620 may be coupled to each other in any arrangement, with any combination buses or direct or point-to-point connections, and through any other components. System 600 may also include any buses, such as a peripheral bus, or components, such as input/output devices, not shown in FIG. 6.

In system 600, system memory 620 may be used to store a value that may be loaded a structure such as structures 111, 121, 213, 215, 223, and 225 described above. Therefore, system memory 620 may be the source of the duplicate or regenerated value according to a method embodiment of the present invention, e.g., as shown in box 470 of FIG. 4.

Processor 100, processor 200, or any other component or portion of a component designed according to an embodiment of the present invention may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the acts of a communication provider or a network provider may be acts of making copies of an article, e.g., a carrier wave, embodying techniques of the present invention.

Thus, apparatuses and methods for reducing the uncorrectable error rate in a lockstepped dual-modular redundancy system have been disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
    a first core including a first structure;
    a second core including a second structure;
    a micro-checker to detect whether a first value from the first structure matches a second value from the second structure;
    a global checker to detect a lockstep failure between the first core and the second core; and
    fault logic to cause the first core and the second core to be resynchronized if the global checker detects the lockstep failure and the micro-checker detects a mismatch between the first value and the second value, and to indicate the detection of an uncorrectable error if the global checker detects the lockstep failure and the micro-checker detects that the first value matches the second value.

2. The apparatus of claim 1, wherein the micro-checker includes a comparator to compare the first value and the second value.

3. The apparatus of claim 1, wherein the global checker includes a comparator to compare a first output of the first core and a second output of the second core.

4. The apparatus of claim 1, wherein:
    the first core also includes a third structure and a fourth structure;
    the second core also includes a fifth structure and a sixth structure;

the first structure includes first fingerprint logic to generate the first value based on a third value from the third structure and a fourth value from a fourth structure; and
the second structure includes second fingerprint logic to generate the second value based on a fifth value from the fifth structure and a sixth value from the sixth structure.

5. The apparatus of claim 1, wherein:
the architectural state of the first core is independent of the first value; and
the architectural state of the second core is independent of the second value.

6. The apparatus of claim 5, wherein:
the first structure is a first prediction structure; and
the second structure is a second prediction structure.

7. The apparatus of claim 1, wherein the fault logic is also to cause the first value and the second value to be regenerated if the global checker detects the lockstep failure and the micro-checker detects the mismatch.

8. The apparatus of claim 7, wherein:
the first structure is a first cache;
the first result is a first cache entry;
the second structure is a second cache; and
the second result is a second cache entry.

9. The apparatus of claim 8, wherein the fault logic is also to cause the first cache entry and the second cache entry to be reloaded if the global checker detects the lockstep failure and the micro-checker detects the mismatch.

10. A method comprising:
checking whether a first value from a first structure in a first core matches a second value from a second structure in a second core;
detecting a lockstep failure between the first core and the second core;
resynchronizing the first core and the second core if a mismatch is detected between the first value and the second value; and
indicating the detection of an uncorrectable error if the first value matches the second value.

11. The method of claim 10 further comprising:
generating the first value based on a third value from a third structure in the first core and a fourth value from a fourth structure in the first core; and
generating the second value based on a fifth value from the fifth structure in the second core and a sixth value from a sixth structure in the second core.

12. The method of claim 11, wherein:
generating the first value includes generating a checksum based on the third value and the fourth value; and
generating the second value includes generating a checksum based on the fifth value and the sixth value.

13. The method of claim 10, further comprising:
predicting whether a first instruction is to be executed by the first core based on the first value; and
predicting whether a second instruction is to be executed by the second core based on the second value.

14. The method of claim 10, further comprising regenerating the first value and the second value if the mismatch is detected.

15. The method of claim 14, further comprising:
comparing the first value to the regenerated first value;
comparing the second value to the regenerated second value;
synchronizing the first core to the second core if the second value matches the regenerated second value; and
synchronizing the second core to the first core if the first value matches the regenerated first value.

16. The method of claim 14, wherein the first structure is a first cache, the first value is a first cache entry, the second structure is a second cache, and the second value is a second cache entry, wherein regenerating the first value and the second value includes reloading the first cache entry and the second cache entry.

17. A system comprising:
a dynamic random access memory;
a first core including a first structure;
a second core including a second structure;
a micro-checker to detect whether a first value from the first structure matches a second value from the second structure;
a global checker to detect a lockstep failure between the first core and the second core; and
fault logic to cause the first core and the second core to be resynchronized if the global checker detects the lockstep failure and the micro-checker detects a mismatch between the first value and the second value, and to indicate the detection of an uncorrectable error if the global checker detects the lockstep failure and the micro-checker detects that the first value matches the second value.

* * * * *